United States Patent [19]

Hewitt

[11] Patent Number: 5,094,798
[45] Date of Patent: Mar. 10, 1992

[54] MANUFACTURE OF LIGHTWEIGHT STRUCTURAL PROFILE

[76] Inventor: Michael J. Hewitt, 5 Hayling Crescent, Leicester, LE5 0RH, England

[21] Appl. No.: 587,165

[22] Filed: Sep. 19, 1990

Related U.S. Application Data

[63] Continuation of Ser. No. 253,872, Oct. 5, 1988, abandoned, which is a continuation of Ser. No. 823,496, filed as PCT/GB85/00191, May 8, 1985, abandoned.

[30] Foreign Application Priority Data

May 9, 1984 [GB] United Kingdom ............... 8411864
Jun. 22, 1984 [GB] United Kingdom ............... 84116026

[51] Int. Cl.$^5$ ............................................. B29C 43/56
[52] U.S. Cl. ................................. 264/511; 156/180; 156/242; 264/518; 264/101; 264/112; 264/122; 264/128; 264/257
[58] Field of Search .............. 264/511, 514, 516, 518, 264/571, 112, 113, 121, 122, 128, 101, 166, 257; 425/112, 114, 516; 156/62.1, 180, 242

[56] References Cited

U.S. PATENT DOCUMENTS

| | | | |
|---|---|---|---|
| 2,592,470 | 4/1952 | Ryberg | 264/136 |
| 3,377,220 | 4/1968 | Berger et al. | 264/518 |
| 3,869,334 | 3/1975 | Hughes et al. | 428/331 |
| 3,895,896 | 7/1975 | White et al. | 425/112 |
| 4,146,564 | 3/1979 | Garrick et al. | 264/516 |
| 4,166,090 | 8/1979 | Green et al. | 264/518 |
| 4,645,631 | 2/1987 | Hegenstaller et al. | 264/113 |

FOREIGN PATENT DOCUMENTS

| | | |
|---|---|---|
| 1963 | 5/1979 | European Pat. Off. . |
| 96489 | 12/1983 | European Pat. Off. . |
| 1161005 | 1/1964 | Fed. Rep. of Germany . |
| 2360393 | 4/1978 | France ............... 264/177.1 |
| 264309 | of 1927 | United Kingdom . |
| 319002 | of 1931 | United Kingdom . |
| 1013376 | 12/1965 | United Kingdom . |
| 1170564 | 11/1969 | United Kingdom . |
| 2028406 | 3/1980 | United Kingdom . |
| 2067174 | 7/1981 | United Kingdom . |
| 8203243 | 9/1982 | World Int. Prop. O. . |

Primary Examiner—Jeffery Thurlow
Attorney, Agent, or Firm—Leydig, Voit & Mayer

[57] ABSTRACT

In the manufacture of lightweight structural profile including a resin-bonded core of closely compacted particulate filler, loose filler is packed into a shaping die by means of applied vacuum. The filler is packing within a sheath of glass rovings which is used to draw the packed filler through the die. As the sheath and packed filler are progressed through the die, a liquid bonding resin is introduced to permeate and bond together the packed filler and the sheath. The filler includes layer mineral foam in a coarse particulate form and a free-flowing relatively fine material (such as hollow silicate microspheres) as an additional filler, the additional filler being vacuumed in to occupy the interstices of previously packed foam filler.

21 Claims, 3 Drawing Sheets

MANUFACTURE OF LIGHTWEIGHT STRUCTURAL PROFILE

This is a continuation of copending application Ser. No. 07/253,872, filed on Oct. 5, 1988, now abandoned, which was a continuation of Ser. No. 06/823,496, abandoned, filed as PCT/GB85/00191, May 8, 1985.

TECHNICAL FIELD

This invention is concerned with the manufacture of lightweight structural profile, particularly but not exclusively profile suitable for use in the building or joinery industries instead of timber, for example in the construction of window and door frames and the like, but also for floor boards, joists, rafters and other building components.

BACKGROUND ART

In International patent specification No. WO 81/00588 there is described a method of manufacturing window and door frames from cored extruded plastics profiles in which the core material may be of high quality plywood or other suitable material (for example a cement-bonded fibrous material such as cement-bonded chipboard or cement-bonded glass fibres) provided with a cladding of plastics material e.g. polyvinylchloride.

For such frames the core material is required to possess a high degree of dimensional and shape stability and to be of adequate strength to bear the loads encountered by the frames in use in various weather conditions. Furthermore, as a timber substitute it may be desirable that the core material should possess good screw-holding properties.

In U.K. patent specification No. 2 028 406 B there is disclosed a method of manufacturing an extruded construction strip which is suitable for use in the manufacture of frames for windows and the like and which comprises a tubular section of thermosoftening plastics material (specifically PVC) filled with a matrix of methylmethacrylate with hollow silicate spherules as a filler. As described, the construction strip may incorporate within the matrix a number of filaments (specifically glass rovings) extending lengthwise of the strip for reinforcement purposes. In manufacturing the strip the plastics sheath forming the hollow section is extruded by a first extruding machine and the sheath is filled by extruding thereinto (by a second extruding machine) the plastics matrix of methylmethacrylate incorporating the silicate spherules, being extruded in the cold state into the hollow sheath whilst the latter is still hot. The glass rovings are drawn into the matrix during its extrusion by some means not disclosed. Curing of the matrix takes place as the strip is fed through a sizing bush of considerable length. It is apparent that the matrix must comprise a relatively high proportion of resin (methylmethacrylate) enabling the matrix to flow freely under pressure to fill the hollow section.

Furthermore, there is described in International patent specification No. WO 82/03243 a method of making somewhat similar structural profile, in which method: (i) a core comprising an unsaturated polyester resin incorporating a silicate filler and an additional mineral filler, thoroughly mixed and tightly compacted together, is extruded through a die, (ii) a sheath of a plastics material is extruded around the core, and (iii) the sheathed core is cured by means of heat, so as to effect curing of the core and cross-linking between the core and the sheath. The preferred silicate filler for that process, as described therein, is in the form of lightweight hollow microspheres, and an acrylic coating is preferred for the plastics sheath.

According to the process described in specification No. WO 82/03243, a very close packing of the selected fillers could be achieved, resulting in a considerable reduction in the amount of resin required. However, a further reduction in the resin content can be desirable. Furthermore, there could be an advantage in using, at least as the primary filler for the core of such structural profile, a readily-manufacturable material that could reduce the dependence on commercially supplied fillers.

There are known, and described for example in European patent specification No. 0 096 489 (A1), rigid inorganic foams of cellular structure comprising one or more layer minerals (hereinafter referred to as layer mineral foams). The term "layer minerals" includes vermiculite, kaolinite, kaolin-containing clays such as ball clays, china clays and fire clays, montmorillonite and sepiolite. Mixtures of layer minerals may be employed in making foams, as also may mixtures of one or more layer minerals with one or more materials other than layer minerals. Where the foam comprises at least a major proportion of clays (hereinafter referred to as a clay foam) it may be sintered to confer improved strength and water-stability.

Such rigid foams have been proposed for various uses, including insulation uses and the fire-protection of substrates. Whilst often produced in the form of extruded board or slab-stock, the foams are also produced in a coarse particulate extruded form known as prills, the prills comprising short extruded strands of the foam material. Production of such foams can be effected utilising readily available materials and relatively simple machinery.

DISCLOSURE OF INVENTION

It has now been found that such rigid foam materials can be used most effectively and advantageously in a method of manufacturing lightweight structural profile in which there is formed in a pultrusion process a core comprising closely compacted and bonded particulate filler comprising layer mineral foam in a coarse particulate form.

In a technique developed for the purpose of enabling loose particulate layer mineral foam (i.e. not pre-mixed with liquid resin) to be introduced into a shaping die in an efficient manner, preferably applied vacuum is utilised to draw in and pack the filler. This technique could find wider application in use with other fillers in manufacturing lightweight structural profile, and the invention in this one of its aspects is characterised in that it comprises packing loose particulate filler into a shaping die by means of applied vacuum and progressing the packed filler through the die to become bonded in formation of the core.

Such a vacuum packing technique can enable particularly high packing densities to be achieved where the filler comprises a relatively coarse primary filler (e.g. layer mineral foam prills) and a relatively fine free-flowing additional filler (e.g. hollow silicate microspheres), the additional filler being drawn in separately to occupy interstices in previously packed primary filler.

To enable vacuum to be applied, the walls of the die can be provided with airways leading from the interior of the die. The airways may lead to one or more manifolds maintained at reduced pressure, a stream of air (or other gas) so being drawn into the die, and filler consequently being drawn into the die and packed. A suitable filter arrangement can prevent filler particles from entering or obstructing the airways in the die walls.

For certain products it might be desirable to arrange to have filler of a higher specific gravity towards the outside of the core than in the middle. This could be achieved by first packing by vacuum the heavier filler against the walls of the die and thereafter packing (also by means of vacuum) lighter filler into the middle.

The manufacturing method can advantageously employ a pultrusion process similar to that described in U.K. patent specification No. 2 143 768 A. That is to say, glass fibre rovings, or equivalent materials, can be provided trapped between outer surfaces of a body of packed filler and walls of the shaping die, the rovings being pulled with the packed filler through the die as the profile is formed. Such use of glass fibre rovings can be of particular benefit in easing the shaping process, serving to keep down the back pressure in the die with a consequent saving of wear in the apparatus generally and minimising any breakdown of the filler by crushing owing to excessive pressures. The fibres may provide a complete resin-bonded sheath for the core. If required, a plastics coating can be applied to the outside of the fibre-clad core, again as referred to in patent specification No. 2 143 768 A, though with suitable resins and pigments this may be unnecessary to provide finished profile with a fully satisfactory outer surface.

In a preferred method, after the loose filler has been vacuum packed within the extrusion die a bonding resin is caused to permeate the interstices of the packed filler (and the surrounding sheath of fibres, if present) the resin thereafter being caused or allowed to cure or set. Advantage may be gained from at least the surface of the filler being at an elevated temperature when the bonding resin is introduced.

Preferably, after initial packing by means of applied vacuum the packed filler is progressed through a convergent portion of the shaping die to achieve further consolidation of the packed filler. Introduction of a bonding resin into the packed filler preferably occurs as the filler is progressed through the convergent portion.

There now follows a detailed description, to be read with reference to the accompanying drawings, of a method of making lightweight structural profile, which method illustrates the invention in its various aspects by way of example.

BRIEF DESCRIPTION OF THE DRAWINGS

In the accompanying drawings.

BEST MODE OF CARRYING OUT THE INVENTION

Figure 1:
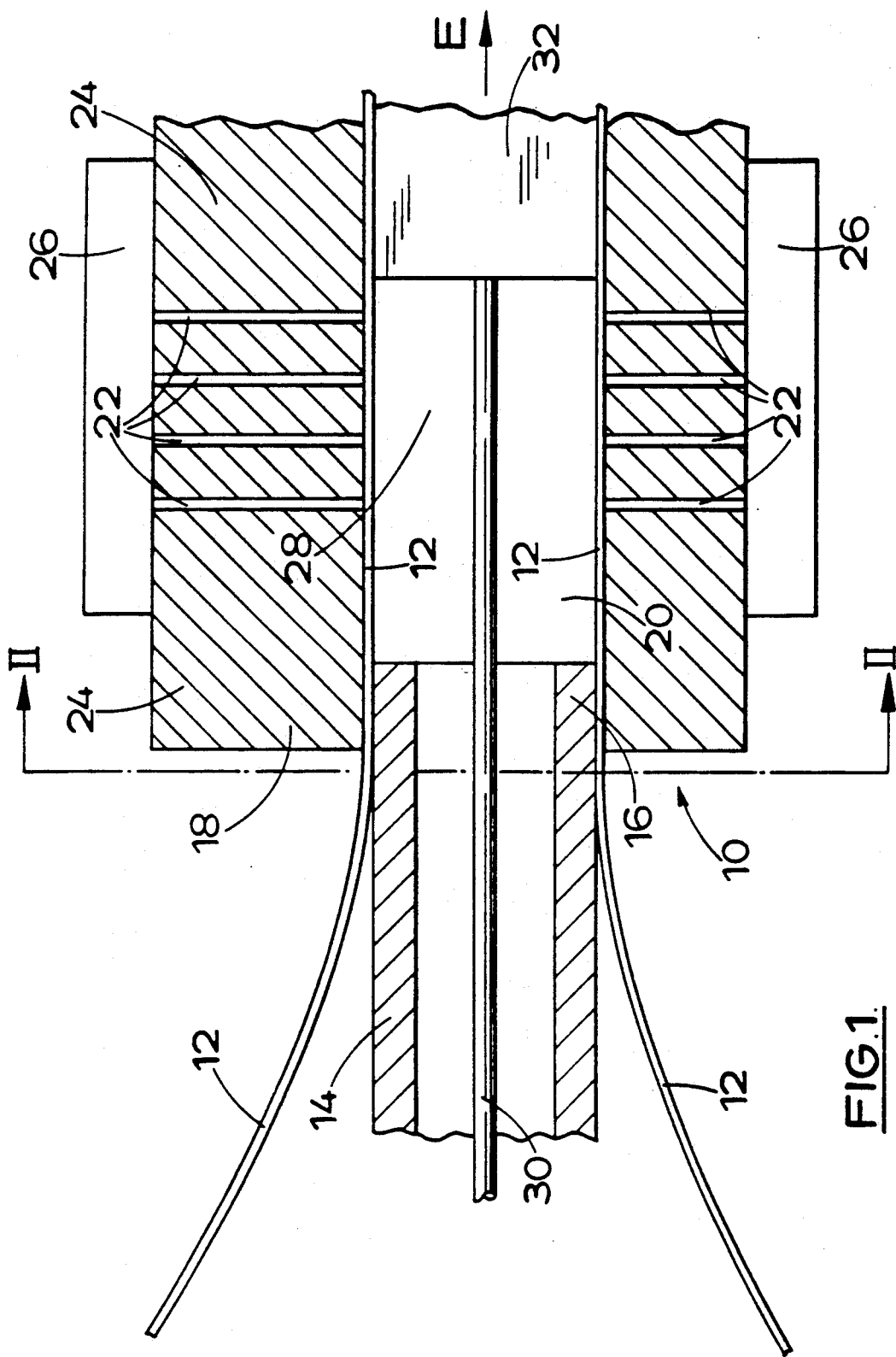
FIG. 1 is a diagrammatic illustration of a packing section of pultrusion apparatus for producing profile.

In the manufacture of lightweight structural profile comprising a core of closely compacted resin-bonded particulate filler within a sheath of resin-bonded reinforcing fibres, a shaping die 10 lined with continuously supplied reinforcing fibres in the form of glass rovings 12 is packed from one end with loose particulate filler, from feeding means comprising a conduit 14, as the rovings are continuously drawn through the die (in the direction of the arrow E in FIG. 1). Reference can be made to U.K. patent specification No. 2 143 768 A for a further example of the manufacture of profile comprising a fibre-sheathed core in such a pultrusion process.

A nose portion 16 of the conduit 14 is received within an entry portion 18 of the die 10 and is shaped similarly to the interior cross-section of the die in that region to define a suitable gap (all around the nose portion) to permit and control introduction of the glass rovings 12 on to the wall surfaces defining the die cavity 20. The glass rovings are fed in, in continuous lengths, from supply drums 21 (FIG. 3) and are caused to line the die cavity 20 substantially uniformly over all its wall surfaces.

A generally annular array of airways, comprising fine radial bores 22 in the walls 24 of the die 10, connect the die cavity 20 with the interiors of low pressure manifolds 26. The manifolds are connected to a vacuum pump 27, whereby air can be drawn from the manifolds to reduce air pressure within the die cavity. By this means, particulate filler supplied to the die cavity from the feeding means through the conduit 14 can be vacuumed into a packing region 28 of the cavity (within the array of airways) and so packed within the sheath of glass rovings 12 in that region. The sheath of rovings itself serves to some extent as a filter preventing filler particles from entering or obstructing the airways 22, but additional filtering means (not shown) can be provided to prevent the passage of fine filler particles.

Figure 2:
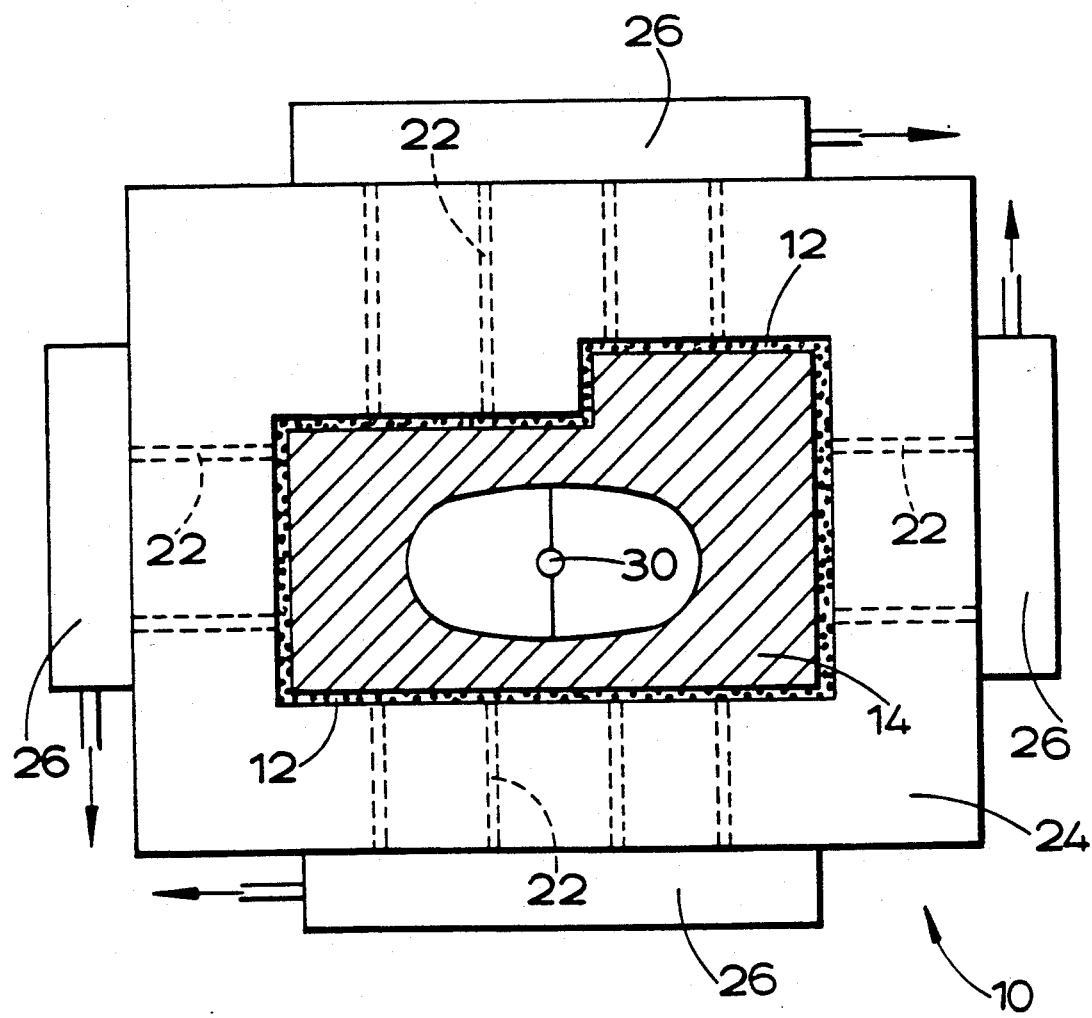
FIG. 2 is a diagrammatic cross-sectional view of the apparatus on the line II—II of FIG. 1.

In the construction shown in FIGS. 1 and 2, a resin feeding tube 30 of resin feeding means extends longitudinally through the conduit 14 and the die cavity 20 substantially to the limit of the packing region 28 (which is to say, it extends to the limit of, or very slightly beyond, that portion of the die 10 provided with the bores 22). Alternatively, and as indicated in FIG. 3, resin can be introduced through a feeding tube 31 through the die wall to a feeding channel 33 in the die wall extending in a loop around the die cavity.

At the start of operation, a plug 32 (FIG. 1) is positioned to occupy the die cavity 20 immediately beyond the packing region 28. The plug 32 is shaped similarly to the interior cross-section of the die in that region to define a suitable gap to accommodate and hold the glass rovings 12 against the interior die wall surfaces. The plug provides, in effect, a dummy section of core which together with the sheath of rovings around it blocks the die to permit initial vacuum packing of the filler. Once filler has been packed by vacuum into the packing region 28, continuous formation of profile can commence by withdrawal (in the forwards direction) of the plug 32 at normal forming speed. The plug is of a compressible foam material which permits it to be drawn through the convergent die. The plug is drawn from the die in a similar manner to that in which the profile will thereafter be drawn through and from the die, which is to say by applying a pulling force in the direction of passage to the glass rovings 12 held to the plug/core (in a similar manner to that described in U.K. patent specification No. 2 143 768 A, hereinbefore referred to). Liquid resin is fed through the feeding tube 30 or 31 to permeate the packed filler and the glass rovings 12, the resin thereafter being caused or allowed to cure or set to provide a shaped body of predetermined cross-section of sheathed resin-bonded filler.

More or less immediately following the region 28, there is a compressing region 34 within the die 10 in which a convergence of the die walls causes compression and further consolidation of the core as it passes to a final forming region 36 of the die.

Figure 3:
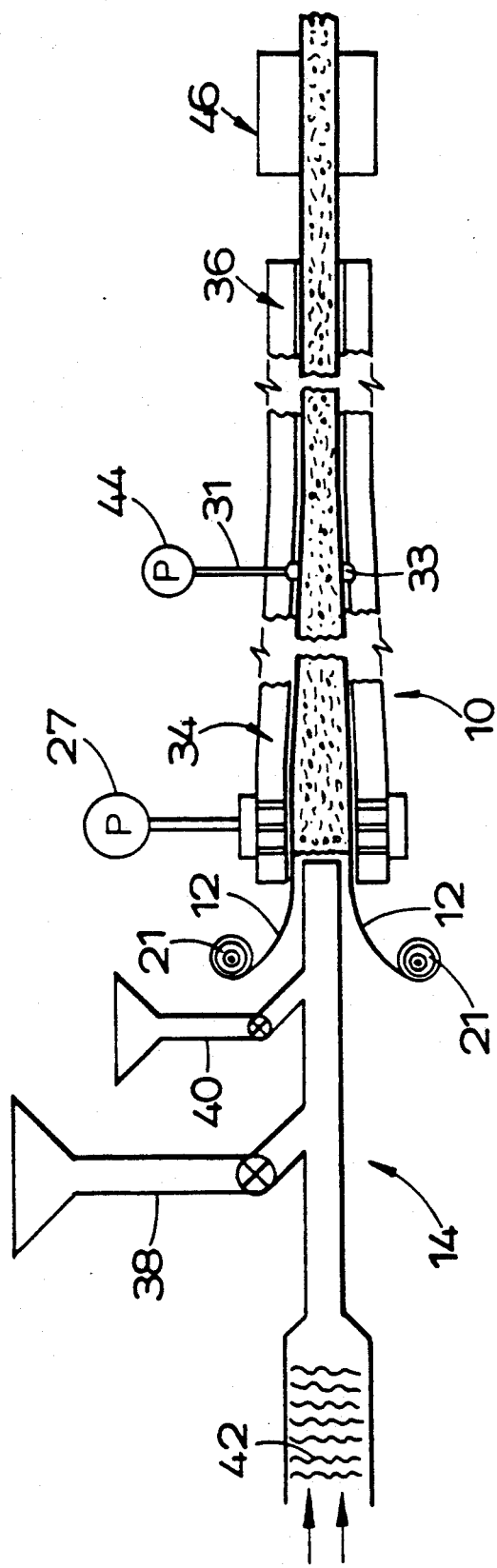
FIG. 3 is a schematic illustration of the apparatus as a whole.

With particular reference to FIG. 3, the feeding means for supplying particulate filler to the shaping die 10 comprises two feed shutes 38 and 40 leading into the feed conduit 14. Each of the shutes is valved to enable measured portions of filler materials to be delivered into the conduit 14 as required. The vacuum pump 27 in operation draws an air stream through the conduit 14, and heating means 42 within an entry portion of the conduit enables the air to be heated if required. Resin is supped to the resin feeding tube 30 or 31 by means of a supply pump 44. The resin supply can be controlled by monitoring the pressure in the feeding tube. Profile drawing means 46, of a kind well known in the pultrusion art, acts continuously to draw the glass rovings 12 (and the profile core) through the shaping die 10.

The particulate filler comprises layer mineral foam in a coarse particulate form as a primary filler. Suitable clay foam prills (being short extruded strands) are as promoted in the U.K. by Imperial Chemical Industries PLC as "K4 Inorganic Foam". The prills may, for example, have a mean extruded length of around 5 mm and a diameter of about 2 mm, and their specific gravity can fall (at choice) anywhere within as wide a range as 0.1 to 0.6; partly reflecting that, the proportion (by weight) of filler in the resin-bonded product can vary between, say, 25% and 80% (depending also on the type of resin used).

Whilst the particulate layer mineral foam alone may constitute the filler, it is usually preferable that a suitable secondary filler be incorporated. This additional filler should be a relatively fine filler, and to permit efficient incorporation by the vacuum packing technique it should be a free-flowing material. A preferred secondary filler comprises (at least as the primary constituent) silicate material in the form of hollow microspheres; such material is widely known as a filler and is available commercially either as recovered from power station waste or as manufactured "glass bubble" filler.

Chopped glass strands may also be introduced in addition to the foam clay and hollow silicate fillers.

Employing the vacuum packing technique (hereinbefore described) the primary and secondary fillers are introduced into the shaping die separately in discrete measured portions. A first of the feed shutes 38 is used to supply the primary filler (the prills), and the second feed shute 40 is used to supply the secondary filler (the microspheres), measured portions of the two fillers being supplied alternately. Accordingly, a portion of primary filler is first released from the first feed shute 38, and the filler is drawn by vacuum into the packing region 28 of the shaping die. A portion of secondary filler is then released from the second feed shute 40 and drawn into the packing region 28 and into the interstices of the packed portion of primary filler. A next measured portion of primary filler can be released from the first feed shute 38 at a suitable time, bearing in mind that forming is taking place continuously, with the glass rovings 12 being drawn continuously through the die 10 by means of the profile drawing means 46.

Further consolidation of the initially vacuum packed primary and secondary fillers occurs as the core material is progressed next through the compressing region 34 of the die 10. With the resin-feeding arrangement as shown in FIG. 3, a bonding resin is introduced through the feeding tube 31 shortly before the end of the compressing region of the die. The resin (whether introduced at the centre of the packed filler as from the tube 30 in FIGS. 1 and 2, or at the periphery as from the tube 31) permeates the remaining interstices of the packed filler (and the glass fibre rovings 12) by capillary attraction and the effects of increasing pressure as the material moves through the die. A non-foaming phenolic resin system which has been used successfully is one available in the U.K. from BP Chemicals under the trade marks Cellobond J25/425L resin and Phencat 10 catalyst. Typically, in use of that resin system, with about 5% of the catalyst, the heating means 42 is utilised to result in the foam clay filler having a surface temperature of around 70° C. when the resin (i.e. mixed resin and catalyst) is introduced, the shaping die 10 itself being at a temperature ranging from not more than about 90° C. at its entry end to around 130° C. towards its outlet end.

In the finished profile the proportions of the constituents (by volume) can be within the following ranges:
Layer mineral foam prills (primary filler): 50%–60%
Hollow silicate filler (additional filler): 28%–32.5%
resin: 12%–17.5%

The finished sheath thickness may typically be 0.5 mm to 0.75 mm.

I claim:

1. A method of making a lightweight structural profile having a high degree of dimensional and shape stability in a continuous pultrusion-type process in which a profile-forming mass comprising tensile reinforcing elements extending longitudinally of the profile is drawn through a shaping die comprising an exhaustible packing section at an inlet end thereof, the method comprising the steps:
   (a) drawings said tensile reinforcing elements into said shaping die to extend longitudinally through said packing section,
   (b) drawing a vacuum to suck loose particulate filler material into said packing section containing said reinforcing elements and thereby forming a packed mass comprising said filler material and said reinforcing elements within said packing section,
   (c) progressing said packed mass from said exhaustible packing section and through said die by pulling said mass towards a discharge end of said die as enabled by said tensile reinforcing elements,
   (d) injecting a bonding agent into said packed mass and causing said bonding agent to permeate said packed mass,
   (e) causing the packed mass within the shaping die to become bonded together by means of said injected bonding agent, and
   (f) pulling said bonded packed mass out through said discharge end of said shaping die to form said structural profile with said filler bonded in a closely compacted condition.

2. A method according to claim 1 in which said tensile reinforcing elements are glass fibres.

3. A method according to claim 1 in which said bonding agent is a resin that is caused to permeate said packed mass as the packed mass is drawn through the shaping die.

4. A method according to claim 3 in which the resin is introduced into the packed filler when the filler has an elevated surface temperature.

5. A method according to claim 1 in which after formation of said packed mass in said packing section by means of drawing of said vacuum the packed mass including said reinforcing elements is drawn through a convergent section of the die to achieve further consolidation of the mass.

6. A method according to claim 5 in which said bonding agent is a resin that is caused to permeate the packed mass as the packed mass is drawn through the convergent section of the die.

7. A method according to claim 1 in which by means of applied vacuum a primary and an additional filler are introduced successively into the die, the additional filler being a relatively fine free-flowing filler which is drawn in to occupy interstices of packed primary filler.

8. A method according to claim 1 in which the filler comprises layer mineral foam in a coarse particulate form.

9. A method according to claim 7 in which the primary filler comprises layer mineral foam in a coarse particulate form and the additional filler includes a silicate filler in the form of hollow microspheres.

10. A method of making a lightweight structural profile having a high degree of dimensional and shape stability in a continuous pultrusion-type process in which a profile-forming mass comprising tensile reinforcing fibrous material extending longitudinally of the profile is drawn through a shaping die comprising an exhaustible packing section at an inlet end thereof, the method comprising the steps:
(a) drawing said tensile reinforcing fibrous material into said shaping die to form a sheath of said material extending longitudinally through said packing section and lining said die,
(b) drawing a vacuum to suck loose particulate filler material into said packing section containing said sheath and thereby forming a sheathed packed mass comprising said filler material and said sheath within said packing section,
(c) causing a bonding agent permeating said sheathed packed mass to bond together said sheathed packed mass within said shaping die, and
(d) drawing said bonded sheathed packed mass through the shaping die and out through a discharge end thereof by exerting a pulling force thereon in the direction of passage through said shaping die to form said structural profile with said filler bonded in a closely compacted condition.

11. A method according to claim 10 including injecting said bonding agent into said sheathed packed mass and causing said bonding agent to permeate said mass.

12. A method according to claim 10 in which after formation said sheathed packed mass is drawn through a convergent section of said shaping die to achieve further consolidation of the mass.

13. A method according to claim 10 in which a primary and an additional filler are sucked successively into the packing section of the die, the additional filler being a relatively fine free-flowing filler which is drawn in to occupy interstices of the packed primary filler.

14. A method of making a lightweight structural profile having a high degree of dimensional and shaped stability in a continuous pultrusion-type process in which a profile-forming mass comprising tensile reinforcing elements extending longitudinally of the profile is drawn through a shaping die comprising an exhaustible packing section at an inlet end thereof and a relatively smaller cross-section convergent section downstream of said packing section, the method comprising the steps:
(a) drawing said tensile reinforcing elements into said shaping die to extend longitudinally through said packing section, and
(b) drawing a vacuum to suck loose particulate filler material into said packing section containing said reinforcing elements and thereby forming a packed mass comprising said filler material and said reinforcing elements within said packing section,
(c) progressing said packed mass from said exhaustible packing section and through said die by pulling said mass towards a discharge end of said die as enabled by said tensile reinforcing elements,
(d) pulling said packed mass through said convergent die section to more tightly compact the packed mass,
(e) causing a bonding agent permeating said packed mass to bond together said packed mass within said shaping die, and
(f) pulling said bonded packed mass out through said discharge end of said shaping die to form said structural profile with said filler bonded in a closely compacted condition.

15. A method according to claim 14 including injecting said bonding agent into said packed mass in said convergent die section and causing said bonding agent to permeate said mass.

16. A method according to claim 14 in which a primary and an additional filler are sucked successively into the packing section of the die, the additional filler being a relatively fine free-flowing filler which is drawn in to occupy interstices of the packed primary filler.

17. A method according to claim 14 including drawing tensile reinforcing fibrous material into said shaping die to form a sheath of said material lining said die and forming a sheathed packed mass with said filler material within said packing section.

18. A method of making a lightweight structural profile having a high degree of dimensional and shape stability in a continuous pultrusion-type process in which a profile-forming mass comprising tensile reinforcing elements extending longitudinally of the profile is drawn through a shaping die comprising an exhaustible packing section at an inlet end thereof, the method comprising the steps:
(a) drawing said tensile reinforcing elements into said shaping die to extend longitudinally through said packing section,
(b) drawing a vacuum to suck a first loose particulate filler materials into said packing section containing said reinforcing elements to provide packed first filler,
(c) drawing a vacuum to suck a second relatively finer particulate filler material into said packing section containing said packed first filler so as to occupy interstices of said packed first filler and thereby forming a packed mass comprising said first and second filler materials and said reinforcing elements within said packing section,
(d) progressing said packed mass from said exhaustible packing section and through said die by pulling said mass towards a discharge end of said die as enabled by said tensile reinforcing elements,
(e) causing a bonding agent permeating said packed mass to bond together said packed mass within said shaping die, and
(f) pulling said bonded packed mass out through said discharge end of said shaping die to form said structural profile with said filler bonded in a closely compacted condition.

19. A method according to claim 18 including injecting said bonding agent into said packed mass and causing said bonding agent to permeate said mass.

20. A method according to claim 18 in which after formation said packed mass is drawn through a convergent section of said shaping die to achieve further consolidation of the mass.

21. A method according to claim 18 including drawing tensile reinforcing fibrous material into said shaping die to form a sheath of said material lining said die and forming a sheathed packed mass within said filler material within said packing section.

* * * * *